US012613789B2

(12) United States Patent
Korganyan et al.

(10) Patent No.: US 12,613,789 B2
(45) Date of Patent: Apr. 28, 2026

(54) ARTIFICIAL INTELLIGENCE BASED GENERATION OF DATA CONNECTORS

(71) Applicant: Fivetran Inc., Oakland, CA (US)

(72) Inventors: Levon Korganyan, Tarzana, CA (US); Meel Velliste, San Ramon, CA (US); Emrah Diril, Myrtle Beach, SC (US); Sergey Numerov, Walnut Creek, CA (US); Ashutosh Chaurasia, Rajasthan (IN); Shreyans Shrimal, Telangana (IN); Varun Dhall, Uttar Pradesh (IN); Ravi Sharda, Karnataka (IN)

(73) Assignee: Fivetran Inc., Oakland, CA (US)

( * ) Notice: Subject to any disclaimer, the term of this patent is extended or adjusted under 35 U.S.C. 154(b) by 210 days.

(21) Appl. No.: 18/489,772

(22) Filed: Oct. 18, 2023

(65) Prior Publication Data

US 2024/0378390 A1 Nov. 14, 2024

(30) Foreign Application Priority Data

May 10, 2023 (IN) .............................. 202341033100

(51) Int. Cl.
*G06F 11/3604* (2025.01)
*G06F 8/60* (2018.01)
(Continued)

(52) U.S. Cl.
CPC ............ *G06F 11/3616* (2013.01); *G06F 8/60* (2013.01); *G06F 9/544* (2013.01);
(Continued)

(58) Field of Classification Search
CPC .... G06F 16/3344; G06F 16/93; G06F 16/951; G06F 16/24578; G06F 40/35;
(Continued)

(56) References Cited

U.S. PATENT DOCUMENTS 11,630,870 B2 * 4/2023 Abdunabi ........... G06F 16/9538
707/706
2007/0002689 A1 1/2007 Mateescu et al.
(Continued)

FOREIGN PATENT DOCUMENTS

| CN | 111797242 A | 10/2020 |
|---|---|---|
| CN | 115470339 A | 12/2022 |
| WO | WO 2000/075849 A2 | 12/2000 |

OTHER PUBLICATIONS

International Search Report and Written Opinion, PCT Application No. PCT/US2024/028651, Aug. 30, 2024, eleven pages.
(Continued)

*Primary Examiner* — Samuel G Neway
(74) *Attorney, Agent, or Firm* — Fenwick & West LLP

(57) ABSTRACT

A device that generates a data connector. The device accesses an index based on representations of documents storing information describing APIs for accessing data source systems, and generates a prompt for a LLM based on information extracted from the index that requests information for accessing data from the data source system. The device provides the generated prompt to the LLM and receives a response describing information associated with the data source. The device determines a measure of ambiguity for the response and, responsive to the measure of ambiguity indicating more than a threshold ambiguity, generates an additional prompt that requests more specific information compared to the information received in the response. The device generates a data connector based on a connector knowledge representation corresponding to the response and deploys the data connector for accessing data from the data source system.

15 Claims, 8 Drawing Sheets

(51) Int. Cl.

| | |
|---|---|
| *G06F 9/54* | (2006.01) |
| *G06F 11/30* | (2006.01) |
| *G06F 16/2457* | (2019.01) |
| *G06F 16/2458* | (2019.01) |
| *G06F 16/334* | (2025.01) |
| *G06F 16/93* | (2019.01) |
| *G06F 16/951* | (2019.01) |
| *G06F 40/35* | (2020.01) |
| *G06N 3/0475* | (2023.01) |

(52) U.S. Cl.
CPC .... *G06F 11/3006* (2013.01); *G06F 16/24578* (2019.01); *G06F 16/2458* (2019.01); *G06F 16/3344* (2019.01); *G06F 16/93* (2019.01); *G06F 16/951* (2019.01); *G06F 40/35* (2020.01); *G06N 3/0475* (2023.01)

(58) Field of Classification Search
CPC .... G06F 11/3616; G06F 11/3006; G06F 8/60; G06N 3/0475
See application file for complete search history.

(56) References Cited

U.S. PATENT DOCUMENTS

| | | | |
|---|---|---|---|
| 2021/0035116 A1 | 2/2021 | Berrington et al. | |
| 2021/0149935 A1 | 5/2021 | De Boer | |
| 2021/0406899 A1 | 12/2021 | Dwivedi et al. | |
| 2023/0033211 A1 | 2/2023 | Ferreira Lima et al. | |
| 2023/0052372 A1* | 2/2023 | Wilson ................... | G06Q 50/18 |
| 2024/0160902 A1* | 5/2024 | Padgett ................ | G06N 3/0895 |
| 2024/0202452 A1* | 6/2024 | Schillace ............. | G06N 3/0475 |
| 2024/0330661 A1* | 10/2024 | Rahman ................. | G06N 3/044 |
| 2024/0378390 A1* | 11/2024 | Korganyan ........... | G06F 16/951 |

OTHER PUBLICATIONS

United States Office Action, U.S. Appl. No. 18/489,769, filed Aug. 28, 2024, twelve pages.

* cited by examiner

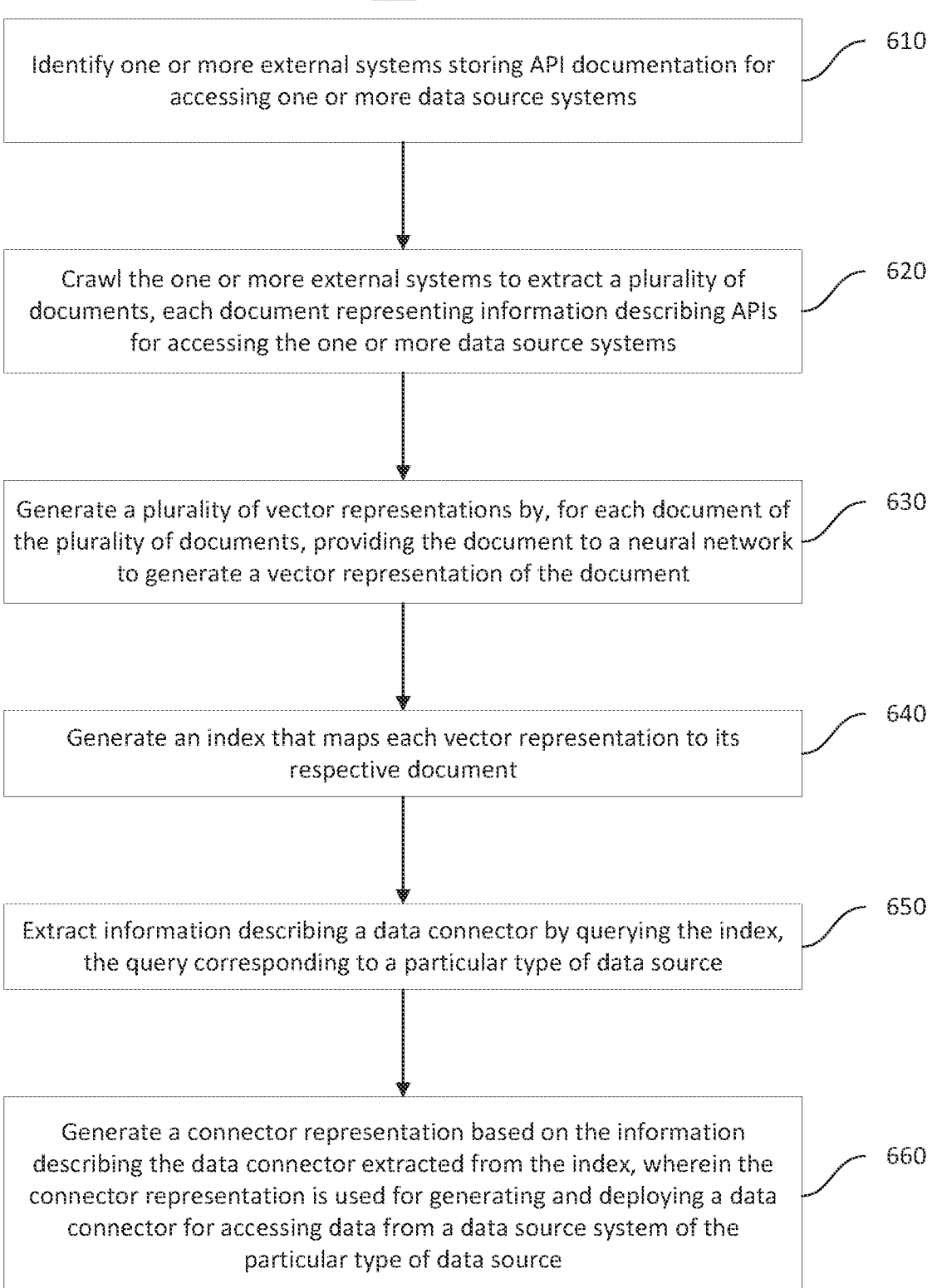

600

Identify one or more external systems storing API documentation for accessing one or more data source systems — 610

Crawl the one or more external systems to extract a plurality of documents, each document representing information describing APIs for accessing the one or more data source systems — 620

Generate a plurality of vector representations by, for each document of the plurality of documents, providing the document to a neural network to generate a vector representation of the document — 630

Generate an index that maps each vector representation to its respective document — 640

Extract information describing a data connector by querying the index, the query corresponding to a particular type of data source — 650

Generate a connector representation based on the information describing the data connector extracted from the index, wherein the connector representation is used for generating and deploying a data connector for accessing data from a data source system of the particular type of data source — 660

FIG. 6

700

Access an index based on representations of documents storing information describing APIs for accessing data source systems — 710

Generate a prompt for a large language model based on information extracted from the index, the prompt requesting information associated with a data connector for accessing data from the data source system — 720

Provide the generated prompt to the large language model — 730

Receive, from the large language model, a response describing information associated with the data connector — 740

Determine a measure of ambiguity for the response — 750

Responsive to the measure of ambiguity indicating more than a threshold ambiguity in the response, generate an additional prompt for the large language model the additional prompt requesting more specific information compared to the information received in the response — 760

Generate a data connector based on a connector knowledge representation corresponding to the response — 770

Deploy the data connector for accessing data from the data source system — 780

FIG. 7

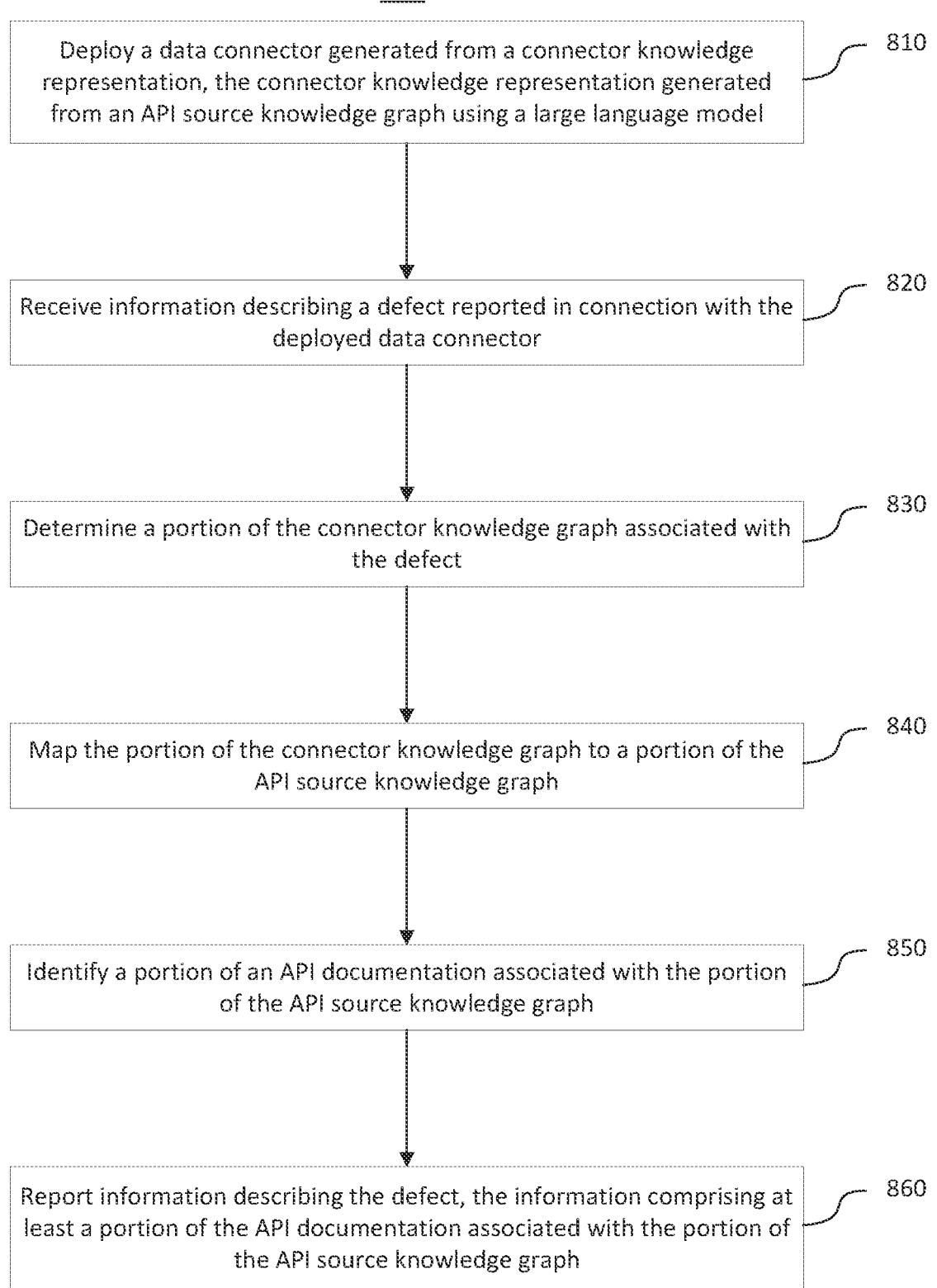

800

Deploy a data connector generated from a connector knowledge representation, the connector knowledge representation generated from an API source knowledge graph using a large language model — 810

Receive information describing a defect reported in connection with the deployed data connector — 820

Determine a portion of the connector knowledge graph associated with the defect — 830

Map the portion of the connector knowledge graph to a portion of the API source knowledge graph — 840

Identify a portion of an API documentation associated with the portion of the API source knowledge graph — 850

Report information describing the defect, the information comprising at least a portion of the API documentation associated with the portion of the API source knowledge graph — 860

FIG. 8

ARTIFICIAL INTELLIGENCE BASED GENERATION OF DATA CONNECTORS

CROSS REFERENCE TO RELATED APPLICATIONS

This application claims the right of priority based on India application serial no. 202341033100, filed May 10, 2023, the disclosure of which is hereby incorporated by reference herein in its entirety.

FIELD OF TECHNOLOGY

This disclosure concerns data analytics in general and more specifically the use of generative artificial intelligence and machine learning based language models for building data connectors for collecting data from heterogeneous data sources.

BACKGROUND

Systems such as data warehouses allow users to perform analysis of data. A data warehouse may store both current and historical data and can give a long-range view of data over time. The data analyzed in a data warehouse may be obtained from various data sources. For example, conglomerate data may be stored in one or more data stores such as Azure Synapse, BigQuery (from Google), Databricks, MySQL, Panoply, Periscope, PostgreSQL, Redshift, Snowflake, SQL Server, Apache Kafka, Amazon S3, and so on. Each data source may store data in a specific format and support a particular set of APIs (application programming interfaces) for accessing data. A conglomerate that uses various types of data sources needs to develop code for accessing these data sources for collecting data for providing to a data warehouse. Due to the differences in the data sources, collecting data from various data sources can be a cumbersome and resource intensive task that consumes significant developer resources of an organization.

SUMMARY

Systems and methods are disclosed herein for automatically building connectors between data warehouses and backbones of conglomerates despite conglomerate-specific nuances in their Application Programming Interfaces (APIs). API source knowledge may be crawled or otherwise automatically analyzed, and a knowledge graph may be built that represents API information in latent space. Generative AI, such as use of one or more Large Language Models (LLMs), may be used to query the knowledge graph to determine attributes to build for a connector between one or more data warehouses and the conglomerate backbone. After deployment of a connector, the connector may be monitored for defects and those defects may be automatically detected and addressed.

In some embodiments, systems and methods are used to identify external systems storing API documentation and crawls the external systems to extract documents representing information describing APIs for accessing the one or more data source systems. The system generates a plurality of vector representations by, for each document, providing the document to a neural network to generate a vector representation of the document and generates an index that maps each vector representation to its respective document. The system extracts information describing a data connector by querying the index, the query corresponding to a particular type of data source, and generates a connector representation based on the information describing the data connector extracted from the index, wherein the connector representation is used for generating and deploying a data connector for accessing data from a data source system of the particular type of data source.

In some embodiments, the system accesses an index based on representations of documents storing information describing APIs for accessing data source systems, and generates a prompt for a LLM based on information extracted from the index that requests information for accessing data from the data source system. The system provides the generated prompt to the LLM and receives a response describing information associated with the data connector. The system determines a measure of ambiguity for the response and, responsive to the measure of ambiguity indicating more than a threshold ambiguity, generates an additional prompt that requests more specific information compared to the information received in the response. The system generates a data connector based on a connector knowledge representation corresponding to the response and deploys the data connector for accessing data from the data source system.

In some embodiments, the system monitors connectors deployed in a data collection system. The system deploys a data connector generated from a connector knowledge representation, the connector knowledge representation generated from an API source knowledge graph using a large language model. The system receives information describing a defect reported in connection with the deployed data connector, and determines a portion of the connector knowledge graph associated with the defect. The system maps the portion of the connector knowledge graph to a portion of the API source knowledge graph and identifies a portion of an API documentation associated with the portion of the API source knowledge graph. The system reports information describing the defect, the information comprising at least a portion of the API documentation associated with the portion of the API source knowledge graph.

BRIEF DESCRIPTION OF THE DRAWINGS

FIG. 6 depicts an exemplary flow chart illustrating a process for generating an index of source knowledge usable in generating connectors, in accordance with an embodiment.

FIG. 7 depicts an exemplary flowchart illustrating a process for generating a connector by prompting a large language model, in accordance with an embodiment.

FIG. 8 depicts an exemplary flowchart illustrating a process for reporting API documentation associated with a detected defect in a deployed connector, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Systems and methods are disclosed herein that support augmented connector development and maintenance that combines human development with AI (artificial intelligence) driven automations to build and manage data connectors. The systems and methods allow for building and encoding of SaaS (software as services) by referencing their machine-readable descriptions (such as OpenAPI specifications and Postman collections), as well as interpreting online API documentation. The system crawls and indexes documentation, conducts semantic search by employing a vector database, and extracts key insights through a combination of a large language model (such as OpenAI's GPT-3, GPT-4, and so on) with various processes regardless of the format of the documentation. The system collates the insights into a representation of the source and stores the insights in a knowledge graph. The knowledge graph is used by additional machine learning based models, processes, and heuristics to generate a connector definition specified using a domain specific language (DSL) named CoIL (Connector Implementation Language). The system provides user interfaces to allow users to review decisions made by the system and correct them through an IDE (integrated development environment, such as CADE (CoIL Augmented Development Environment)), a centralized hub where AI-driven automations and users e.g., developers can collaborate to develop data connectors. The system supports automatic connector maintenance by repeatedly executing automations periodically to reconcile successive knowledge graph versions, thereby proactively detecting any issues and automatically ensuring that a data connector behavior remains current.

System Environment

Figure 1:
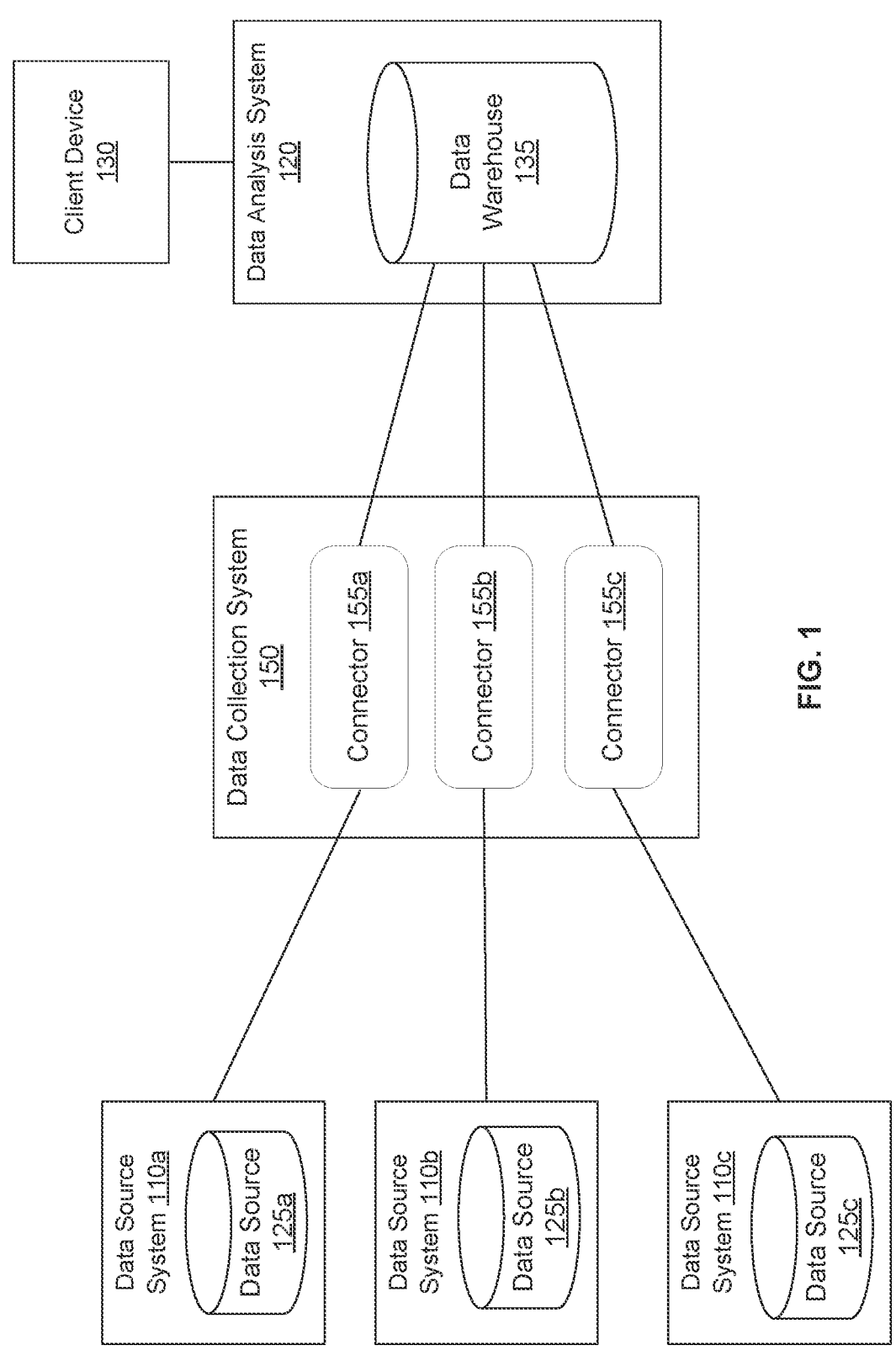
FIG. 1 is an overall system environment for using data connectors to collect data for a data analysis system, in accordance with an embodiment.

FIG. 1 is an overall system environment for using data connectors to collect data for a data analysis system, in accordance with an embodiment. The system environment comprises a data analysis system 120, one or more data source systems 110, a data collection system 150, and one or more client devices 130. The data analysis system 120 is connected to a plurality of heterogenous data source systems 150 via the data collection system, each data source possibly having a distinct data source type or offered by a different entity.

A data source system 110 stores data, for example, data used by an organization or enterprise. The data source system 110 executes instructions for processing data stored in one or more data sources 125. A data source 125 of the data source system 110 has a data source type, for example, a relational database, a file system, a document oriented database system, and so on. A data source system 110*a* may be a database management system such that the data source 125*a* is a database. A particular type of data source may have multiple instances, for example, instances of relational databases. Different instances of a data source may be provided by different vendors. For example, the same organization may store data in relational databases including instances of ORACLE database, SQLSERVER, TERADATA, MYSQL, and so on. Other examples of data sources include data lakes, for example, data lakes offered by CLOUDERA; files stored in a distributed file system, for example, HDFS (HADOOP distributed file system); and cloud data warehouses. A data source may be implemented in a cloud based system, for example, AWS (AMAZON web services), MICROSOFT AZURE, and so on.

The data collection system 150 collects data from various data source systems 110 and provides the data to the data analysis system 120. The data collection system 150 includes one or more connectors 155*a*, 155*b*, 155*c*. A connector (or data connector) allows the data analysis system 120 or any computing system to connect to a data source system and access data from the data source system. The code or instructions for a connector are generated by a data connector management system illustrated in FIG. 2 and described in connection with FIG. 2. The connector may, for example, integrate one or more APIs to enable successful querying of data within a given data source system 110 despite differences in format or type of a query of client device 130 or data currently in the context of data analysis system 120.

According to an embodiment, the data collection system 150 receives credentials of various data source systems 125*a*, 125*b*, 125*c* to establish a connection with each data source system 110*a*, 110*b*, 110*c*. The data collection system 150 provides initial copy of data stored in the data sources 125 to the data analysis system 120 and then continues to keep data stored in the data warehouse 135 up to date with respect to the data sources 125 from where data was obtained.

The data analysis system 120 includes a data warehouse 135 that stores data collected from the data source systems 110. The data analysis system 120 may periodically or at non-periodic times (e.g., upon command) collect data from the data sources 125. The data analysis system 120 obtains data and metadata from various data source systems 110 and performs analysis of the data stored in the data source systems. The data analysis system may present the analysis via a user interface of the client device 130.

The client device 130 used by a user for interacting with the data analysis system 120 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 130 can be any device having computer functionality, such as a personal digital assistant (PDA), mobile telephone, smartphone, wearable device, etc. The client device 130 may be used by a user to view results of analysis performed or for providing instructions to the data analysis system 120.

FIG. 1 and the other figures use like reference numerals to identify like elements. A letter after a reference numeral, such as "110(*a*)" indicates that the text refers specifically to the element having that particular reference numeral. A reference numeral in the text without a following letter, such as "110," refers to any or all of the elements in the figures bearing that reference numeral (e.g. "110" in the text refers to reference numerals "110(*a*)" and/or "110(*n*)" in the figures).

The interactions between the data analysis system 120 and the other systems shown in FIG. 1 are typically performed via a network, for example, via the Internet. The network enables communications between the different systems. In one embodiment, the network uses standard communications technologies and/or protocols. The data exchanged over the network can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

System Architecture

Figure 2:
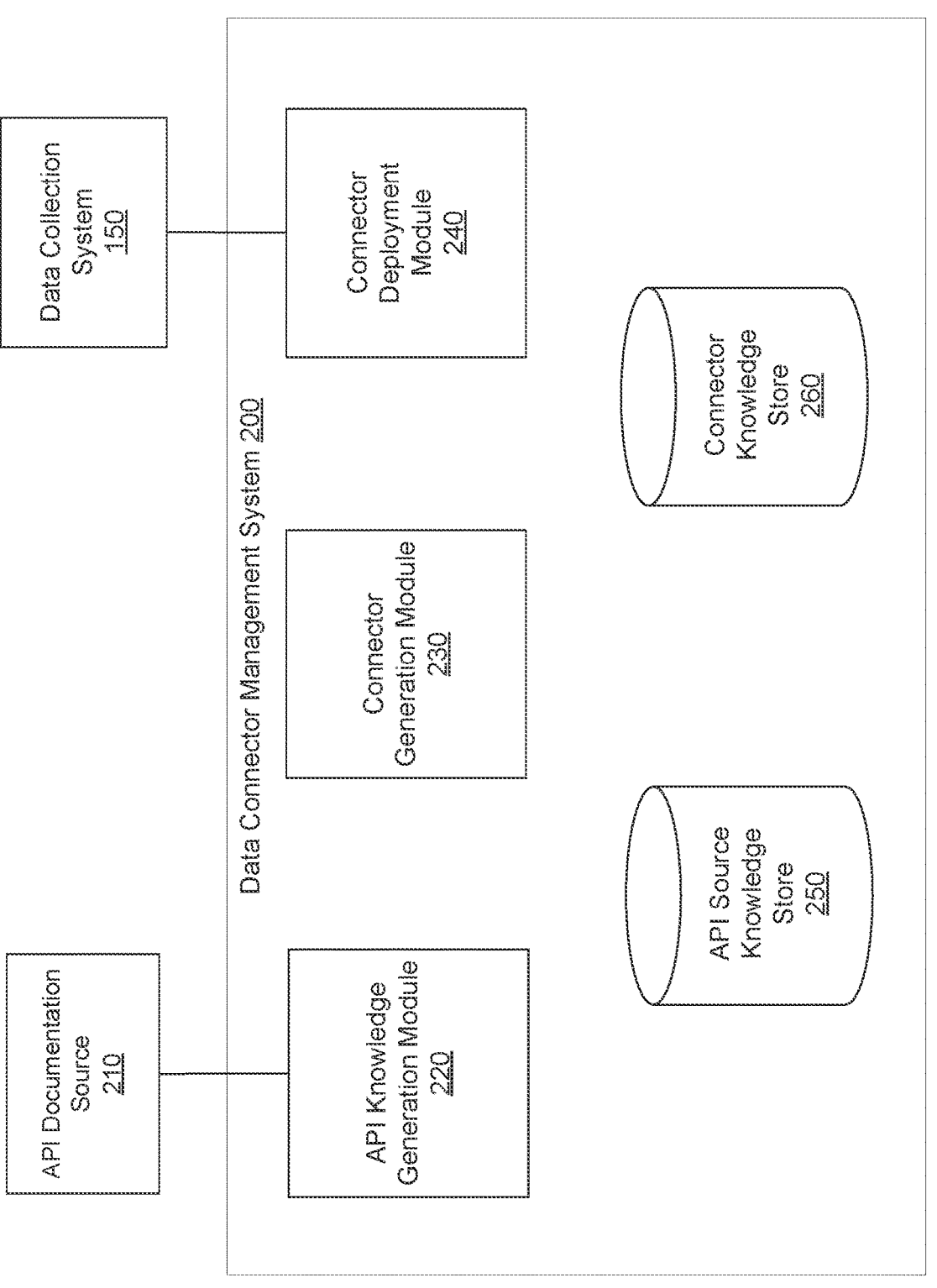
FIG. 2 is the system architecture of a data connector management system, in accordance with an embodiment.

FIG. 2 is the system architecture of a data connector management system, in accordance with an embodiment. The data connector management system 200 includes an AI based API knowledge generation module 220, a connector generation module 230, a connector deployment module 240, an API source knowledge store 250, and a connector knowledge store 260. Other embodiments may include fewer or more modules than those indicated herein. Functionality indicated herein as being performed by a particular module may be performed by other modules instead. Fewer or more modules and/or databases than depicted may be used to achieve the functionality discussed herein.

The API knowledge generation module 220 accesses various API documentation sources 210 (e.g., data source systems 110) to obtain API documentation. The API knowledge generation module 220 extracts the API knowledge from the API documentation and stores the API knowledge in the API knowledge store 250. Particulars about how the API knowledge is extracted are discussed in further detail below with respect to FIGS. 3-8.

Process of API Source Knowledge Extraction

Figure 3:
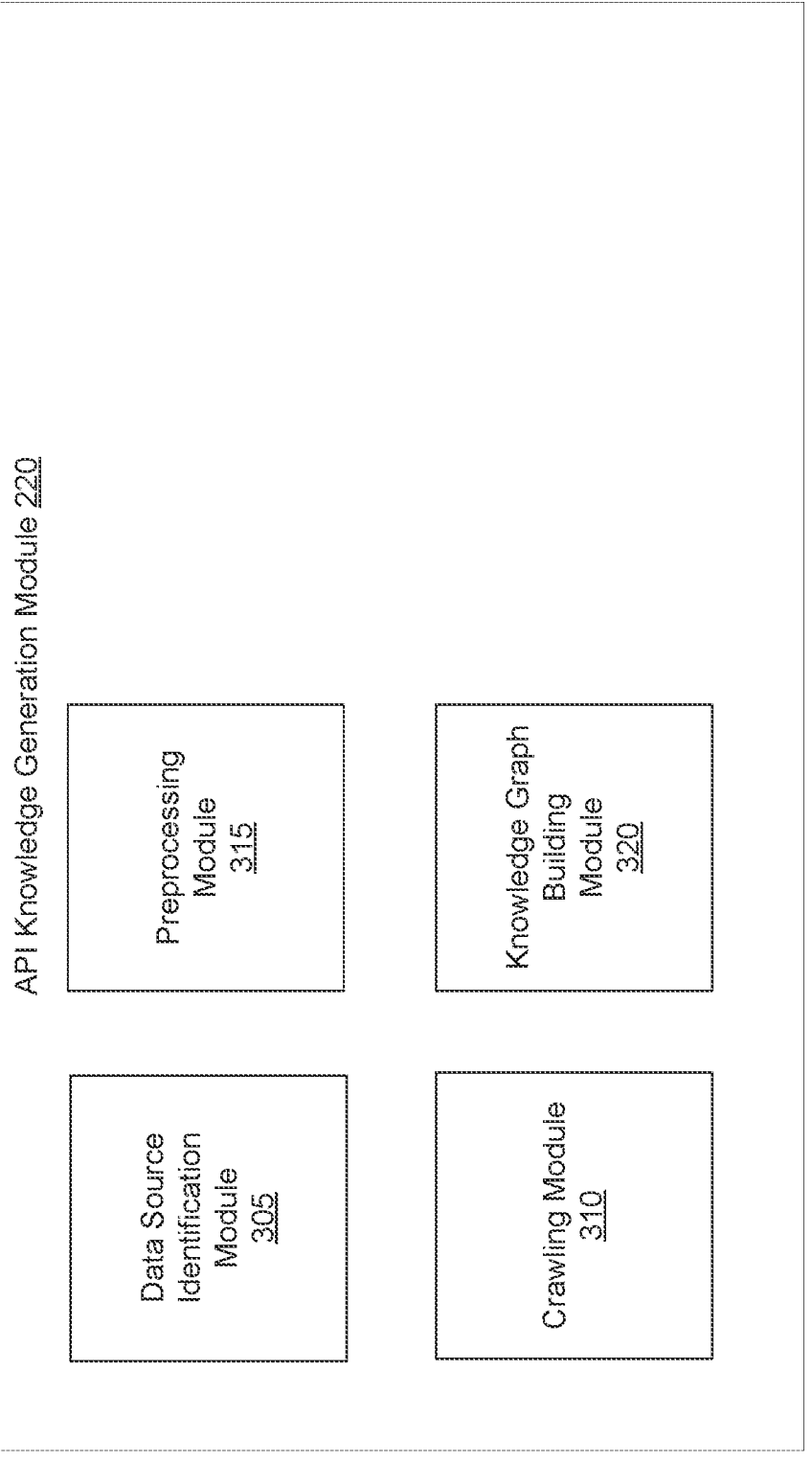
FIG. 3 depicts exemplary modules of an API knowledge generation module, in accordance with an embodiment.

Turning briefly to FIG. 3, FIG. 3 depicts exemplary modules of an API knowledge generation module, in accordance with an embodiment. As depicted in FIG. 3, API knowledge generation module 220 includes data source identification module 305, crawling module 310, preprocessing module 315, and knowledge graph building module 320. More, fewer, and/or different modules may be used to achieve the functionality disclosed herein.

Data source identification module 305 identifies external systems storing API documentation for accessing one or more data source systems. Data source identification module 305 may, for example, detect a request from client device 130 to build a connector between data analysis system 120 and one or more API data sources 125. Data source identification module 305 may, responsive to detecting the request, identify one or more API documentation sources 210 that include documents describing the API of the one or more API data sources 125. In order to identify the one or more API documentation sources 210, data source identification module 305 may determine that the request indicates one or more URLs (uniform resource locators) of websites that provide API documentation for the API data source 125, and may use those URLs to identify the API documentation sources 210.

Additionally or alternatively, data source identification module 305 may determine that the request includes copies of API documentation corresponding to the API data source 125 and may determine those copies to be the API documentation source 210. Additionally or alternatively, the request may indicate the API data source 125, and, responsive to receiving the request, data source identification module 305 may run a search for an API documentation source 210 that includes API documentation for the API data source 125. The search may be run across the Internet at large and/or against an index of known API data sources 125 (e.g., indexed by names of those API data sources 125, and pointing to documentation for those API data sources 125).

Crawling module 310 crawls the identified external system(s) to extract a plurality of documents, each document representing information describing APIs for accessing the one or more data source systems. Crawling module 310 may perform crawling through the identified API documentation using any crawling mechanism. In some embodiments, the API documentation exists on HTML pages accessed by way of identified URLs, and the crawling may occur on those HTML pages. The output of the crawling may include, for each document of the API documentation or subdivision therein, a file (e.g., a markdown file) that includes the content of the API documentation without formatting metadata (e.g., without HTML tags). Each file may have a header (e.g., the same header name as existed in the HTML file, such as the name present in a header tag), and a body that includes the context. A single document may have more than one header, and in some cases may have many headers; crawling module 310 may generate a separate file for each header, with the content corresponding to that header input into that header's file.

In some embodiments, rather than using a traditional crawling mechanism, crawling module 310 may employ a machine learning approach to extract one or more documents of the API documentation. Machine learning approaches that perform crawling activities may be advantageous in some instances in terms of computational efficiency, but may be disadvantageous in others, such as where crawling module 310 detects that content is nested within HTML tags that a machine learning algorithm is not properly trained to interpret. In some embodiments, a hybrid approach may be taken, where crawling module 310 determines whether a document has nested content within HTML tags and, responsive to determining that there is nested content, using a crawling approach, and responsive to determining that there is no nested content, using a machine learning approach.

In some embodiments, preprocessing module 315 processes the extracted API documents. Preprocessing module 315 may process each of the plurality of documents to remove at least a portion of text representing boilerplate description in connection with generating the files that are representative of each document. Boilerplate may include language that is generic and not related to API implementation. Preprocessing module 315 may detect boilerplate using templates, where language in a file and/or document that matches language in a boilerplate template may be determined by preprocessing module 315 to be boilerplate language. Preprocessing module 315 may determine a match to occur using word-level comparisons. In some embodiments, preprocessing module 315 may determine a match to occur by converting language in documents to vector representations (e.g., embeddings in latent space), and may compare those vector representations to boilerplate template vector representations, where a match is considered if a similarity having at least a threshold percentage is detected (e.g., over 90% similarity). Preprocessing module 315 may remove boilerplate from the files generated by crawling module 310.

Knowledge graph building module 320 may generate a plurality of vector representations by, for each document of the plurality of documents, providing the document to a neural network to generate a vector representation of the document. The vector representations may be embeddings that represent content (e.g., text, image, video, and other embedded subject matter within the document such as embedded documents or other renderings) of the document in latent space. The neural network may be trained to output the embeddings given an input of a document using any algorithm for translating any number of dimensions of the document into latent space. An example of a neural network used for generating the vector representation of a document is a large language model (LLM), for example, GPT (a generative pretrained model). The LLM may be used as a zero-shot classifier.

Knowledge graph building module 320 may generate an index that maps each vector representation to its respective document. The index may be formed based on topics, where vector representations of documents may be looked up based on the topic to which they correspond. The topic may be determined to be text extracted from a document's header (and/or a vector representation, such as an embedding representative of the topic determined by inputting the topic into the neural network), as extracted by crawling module 310. The index may enable search functionality, such that when a query relating to a given topic is formed, the knowledge graph may be searched by topic, yielding a search against documents having a header that matches the topic of the query. The index may be hierarchical, where a given API is indexed, and for each given API, topics relating to deploying that API may be indexed. Such a hierarchical index may be developed in reverse, where topics are indexed, and then different APIs corresponding to those topics are sub-indexed. Documents may be pointed to by a lowest layer of the hierarchical index and/or from higher order layers.

The system generates a representation of each connector for accessing a particular type of data source by repeatedly querying the concept index. The system uses the connector representation for generating and deploying data connectors for accessing data from a data source system of the particular type of data source. The data connector may be deployed in the data collection system configured to access data sources and provide data to a data analysis system such as a system hosting a data warehouse. When a query is made in connection with a prompt, data connector management system 200 may extract information describing a data connector by querying the index, the query corresponding to a particular type of data source. Data connector management system 200 may then generate a connector representation based on the information describing the data connector extracted from the index, wherein the connector representation is used for generating and deploying a data connector for accessing data from a data source system of the particular type of data source. The prompt/query functionality is discussed in further detail below with respect to FIG. 4.

As an example of processes that may be performed using the knowledge graph generated using API knowledge generation module 220, the following embodiment steps through an exemplary embodiment. According to an embodiment, the API source knowledge store 250 is implemented as a vector database to allow semantic queries to be performed using the documents. For example, a query may request all documents related to a particular topic such as "authentication." The vector database returns a ranked list of documents based on a query. According to an embodiment, a machine learning based model such as a neural network is used to generate embeddings used as the vector representation of a document. An example prompt generated for providing to the LLM is "Based on the following documentation, the API document supports which of the following authentication methods: [apiKey, oauth2, basic, bearer], or return 'none' if inconclusive."

According to an embodiment, data connector management system 200 generates a vector representation based on the query and identifies documents that are relevant to the query based on vector similarity of documents with the query, such as cosine similarity. For example, to identify the authentication method to be used for a connector, data connector management system 200 identifies portions of documents close to concepts such as 'authentication', 'authorization', 'bearer', 'API Key', 'api token', 'oauth', 'personal access token', etc. The portions of documents retrieved are further processed to identify the exact authentication method. The connector generation module 230 extracts information such as an authentication method for accessing the API, an end point to query and verify that the credentials are valid. If the system identifies multiple documents that are candidates for identifying a concept such as authentication mechanism, the system uses techniques such as majority vote to reduce the number of responses and identify a specific document.

The connector generation module 230 generates a connector definition using the syntax of the DSL (e.g., using CoIL syntax) based on the knowledge describing a connector extracted from the API source knowledge store 250. The connector deployment module 240 deploys and monitors connectors specified using the DSL in the data collection system 150. The activities of API knowledge generation module 220 may be performed responsive to detecting that data analysis system 120 is to interface with one or more data source system 110*a*.

Process of Data Connector Generation

Returning to FIG. 2, connector generation module 230 generates data connectors for use in facilitating various operations. In some embodiments, to generate the data connectors, connector generation module 230 accesses an index storing representations of documents storing information describing APIs for accessing data source systems. Connector generation module 230 generates a connector knowledge representation based on information extracted from the index. Connector generation module 230 may repeatedly query the index using queries that extract more and more specific information from the index. Accordingly, in some embodiments, initial queries may request broad information whereas latter queries may be refined by connector generation module 230 based on the broad information and request more specific information. For example, the query for a particular iteration may be refined based on information extracted using previous queries and requests information that is more specific compared to previous queries.

In some embodiments, the steps of each iteration may be as follows. Connector generation module 230 may generate a prompt for a large language model (LLM) based on information extracted from the index. The prompt requests a specific piece of information associated with a data connector for accessing data from the data source system. Prompts may be formed as part of a wizard, where predetermined information is required to build a connector (e.g., how are logins configured; what authentication scheme is used by data source system 110, etc.), and the wizard generates the prompts according to a predetermined sequence of the wizard.

Connector generation module 230 may provide the generated prompt to the large language model. Connector generation module 230 receives a response generated by the execution of the large language model. Connector generation module 230 describes some information associated with the data connector. Connector generation module 230 determines a measure of ambiguity for the response. For example, if the response provides the requested information, the measure of ambiguity indicates low ambiguity, whereas if the response is broad or returns multiple answers, the measure of ambiguity indicates high ambiguity. Based on the measure of ambiguity, connector generation module 230 determines whether to generate additional prompts for the large language model. Where connector generation module 230 determines that the measure of ambiguity indicates that the current response is ambiguous, connector generation module 230 may generate a prompt that requests more specific piece of information compared to the information obtained currently. Connector generation module 230 may generate a data connector based on the connector knowledge representation, and may deploy the data connector in the data collection system for accessing data from the data source system and providing it to the data analysis system.

Figure 4:
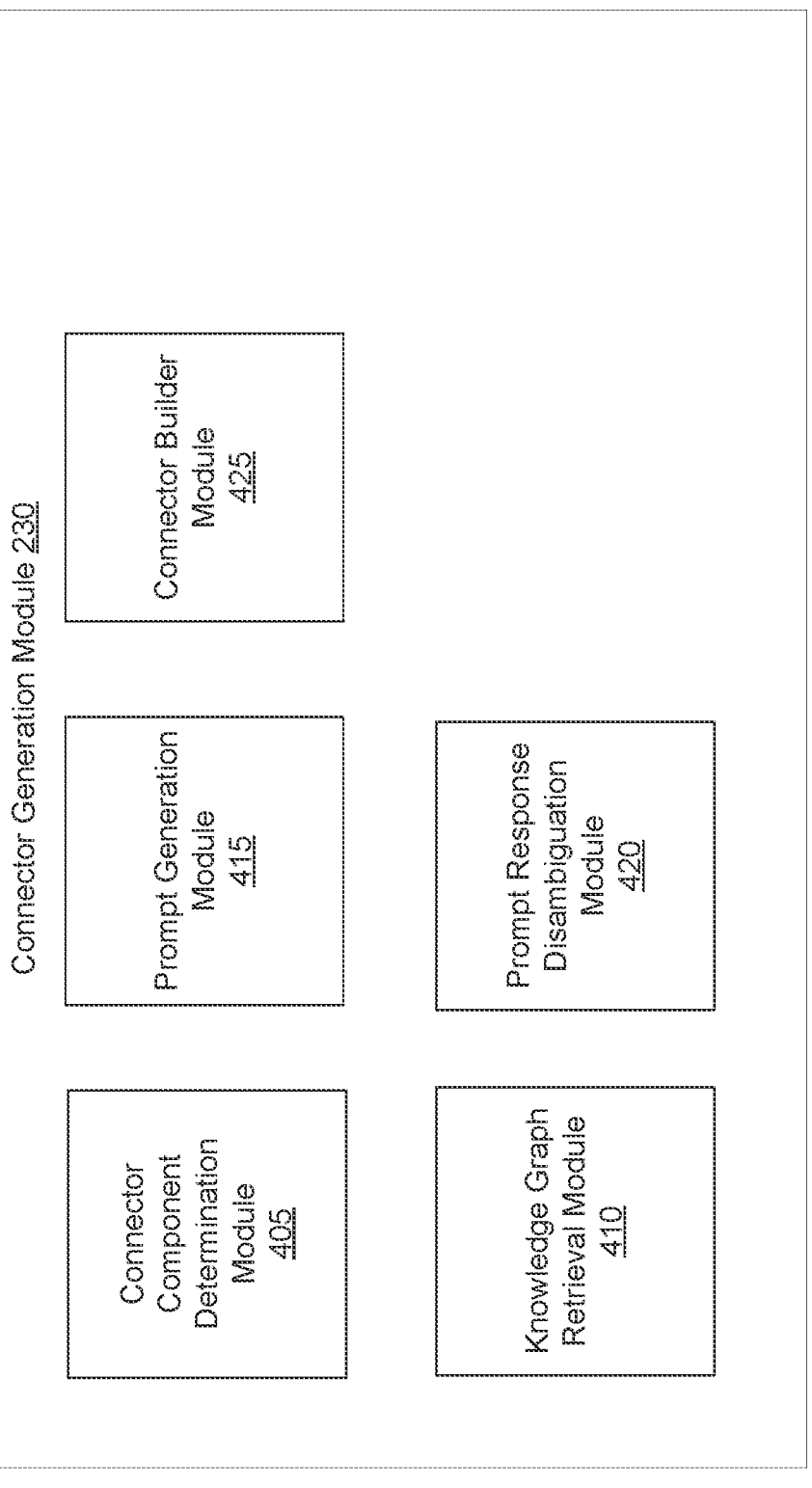
FIG. 4 depicts exemplary modules of a connector generation module, in accordance with an embodiment.

Moving now to FIG. 4 to describe connector generation in more particularity, FIG. 4 depicts exemplary modules of a connector generation module, in accordance with an embodiment. As depicted in FIG. 4, connector generation module 230 includes connector component determination module 405, knowledge graph retrieval module 410, prompt generation module 415, prompt response disambiguation module 420, and connector deployment module 425. More or fewer modules may be used to achieve the functionality described herein.

Connector component determination module 405 determines which components are needed to generate a connector. Connector components may include APIs, and parameters thereof, for accessing data warehouses and/or other applications (e.g., connectors 155 for accessing data source systems 110 by data analysis system 120). Exemplary connector components may include data transformation schema, authentication schema, and the like, each of which are required to access and otherwise perform analysis on the data by data analysis system 120.

Connector component determination module 405 may determine which components are needed to generate a connector by determining a set of known and unknown components. For example, a user interface may be deployed to a user prompting for input of information of known authentication protocols, data transformation schema, and so on. Connector component determination module 405 may determine that where the user omits input for a given component, that given component is unknown. As another example, connector component module 405 may determine characteristics of a data source system and/or requirements of an enterprise backend system, and may determine known parameters for connector components that have historically functioned in successfully deployed connectors. Where historical data is unavailable for a given component, that component may be an unknown component. Connector component module 405 may retrieve known parameters from connector knowledge store 260, which may be queried based on characteristics of the data source system and/or requirements of the backend system for which a connector is being developed. Connector component determination module 405 may determine that the unknown components need to be determined in order to generate a deployable connector. For example, connector component determination module 405 may determine that an authentication protocol is to be determined in order to generate a deployable connector. In some cases, all connector components are declared to be unknown and are determined from scratch.

After determining which connector components are required to generate a connector, knowledge graph retrieval module 410 is used to retrieve information for parameters for each connector component. To this end, knowledge graph retrieval module 410 accesses an index based on representations of documents storing information describing APIs for accessing data source systems, this index being initiated and/or further populated based on activity of crawling API knowledge generation module 220 as discussed in the foregoing with respect to FIGS. 2 and 3. The index is referenced relative to the type of required connector component being determined. For example, if an unknown component relates to determining an authentication protocol for the connector, then the index may be referenced for the topic of "authentication." As the index may be populated using vector representations of topics, knowledge graph retrieval module 410 may reference the index by converting the topic for the connector component into a vector representation, and identifying one or more topics having at least a threshold similarity (e.g., 80% or higher match), and may determine each such topic to be matching. The index may be stored at, and referenced from, API source knowledge store 250.

Prompt generation module 415 generates a prompt for a large language model (LLM) based on information extracted from the index, the prompt requesting information associated with a data connector for accessing data from the data source system. The LLM may be trained and operated by data analysis system 120, or may be deployed by a third party system and accessed over the Internet. Prompt generation module 415, for each given requirement for a connector component, may generate the prompt by including, within the prompt, the vector representations of documentation corresponding to the topic at issue. For example, where authentication for a given API is in question, vector representations of documents relating to that API with a topic of "authentication" may be retrieved. Prompt generation module 415 may provide the prompt to the LLM, requesting to identify one or more documents relating to authentication for the scenario at issue, and to output an authentication mechanism based on what the documents indicate. Prompt generation module 415 may select a prompt from a prompt bank based on what topic is at issue. The prompt may be stored in, for example, API source knowledge store 250. The prompt bank may include an index of topics that are each mapped to one or more prompts. Where more than one prompt is mapped, prompt generation module 415 may select a prompt based on how closely its subject matter matches the required information for the connector component (e.g., using cosine similarity or some other vector comparison in latent space).

Prompt response disambiguation module 420 may receive, from the large language model, a response describing information associated with the data connector. Prompt response disambiguation module 420 may determine a measure of ambiguity for the response. In some embodiments, the determining the measure of ambiguity for the response may involve determining a confidence score of the response, or determining that more than one response is received. Where only one response has at least a threshold confidence score, or where only one response is received, prompt response disambiguation module 420 may determine that there is no ambiguity, and may determine the response to be the information needed for the connector component at issue.

As an example, prompt generation module 415 may determine a subset of documents referenced by the index having at least a threshold similarity to required connector information for a given component. Prompt generation module 415 may instruct the LLM to query the subset of documents with the generated prompt (e.g., the vector representation of the required information), and may receive an interim response from each document of the subset, the interim response indicating whether or not the document includes information relating to the query. Prompt response disambiguation module 420 may then determine the measure of ambiguity to be below the threshold ambiguity based on determining that a first of the interim responses is not a null response and the other interim responses are null responses (that is, only one of the documents is informative of the required information). On this basis, prompt disambiguation module 420 may determine that the non-null interim response includes the information required for generating the connector component at issue.

On the other hand, prompt response disambiguation module 420 may determine that there is an ambiguity based on two or more documents producing different answers to the same inquiry relating to how to generate a given connector component. For example, drawing from the aforementioned example, prompt response disambiguation module 420 may determine the measure of ambiguity to be above the threshold ambiguity based on at least two of the interim responses to be other than a null response and to include different results, which means that there are two conflicting pieces of information that each could be the correct manner of generating the connector component. For example, the different results may be relating to a query for what authentication mechanism should be used, where one result mentions OAuth2, and the other mentions Bearer Authentication. Responsive to the measure of ambiguity indicating more than a threshold ambiguity in the response, prompt response disambiguation module 420 may generate an additional prompt for the large language model the additional prompt requesting more specific information compared to the information received in the response (e.g., "what credentials should be supplied with an OAuth2 and/or Bearer Authentication request?").

Prompt response disambiguation module 420 may repeatedly generate subsequent prompts, each subsequent prompt requesting more specific information compared to previous prompts. This may recur iteratively or recursively until an unambiguous answer is received. Prompt response disambiguation module 420 may retrieve a more specific prompt from the prompt bank. A pre-populated prompt from the prompt bank may be selected based on characteristics of the two or more answers that cause the ambiguity. For example, rules may be set that indicate that when the two answers include particular answers, such as Answer 1 and Answer 2, use this next more specific prompt. As a specific example, where OAuth2 is an answer based on some documents, and Bearer is an answer in other docs, as to which security protocol is to be used, a rule may be set to use a particular more specific prompt to solve this ambiguity. In some embodiments, rather than using pre-set rules, prompt response disambiguation module 420 may determine a more specific prompt to use by comparing the answers to candidate prompts relating to the topic in latent space (e.g., using cosine similarity of an aggregation of the two or more answers), and may select the more specific prompt with the highest similarity. The more specific prompts may include context of the different results, when used, to better inform the LLM as to what to search and/or bias.

As another example of ambiguity, consider a connector component of an endpoint, where an endpoint must be selected from a plurality of candidate endpoints. Connector component determination module 405 may determine that an endpoint needs to be selected. Prompt generation module 415 may generate a prompt relating to endpoint selection given the API being built and any other known constraints, and may operate knowledge graph retrieval module 410 to retrieve one or more matching prompts and select one (e.g., a most general prompt) for use. The prompt may be queried to a LLM, and an ambiguous answer may be received, such as answers naming two or more viable endpoints. Prompt response disambiguation module 420 may iteratively select more specific prompts to be provided to the LLM until an unambiguous answer is received on which endpoint to use.

Connector builder module 425 generates a connector after each connector component is determined. Connector builder module 425 generates the data connector based on a connector knowledge representation corresponding to each of the LLM responses for the prompts for each of the connector components, and deploys the data connector for accessing data from the data source system. In some embodiments, connector builder module 425 deploys a data connector generated from a connector knowledge representation stored in the connector knowledge store 260. The connector knowledge representation is generated from an API source knowledge graph stored in the API source knowledge store 250 and is generated based on a large language model.

In some embodiments, connector builder module 425 builds a data structure having a pointer from a connector component to source knowledge. For example, the pointer for a given component may point to the API document used to determine that the given component should be built. This pointer may be referenced in any number of scenarios (e.g., where a developer seeks to understand why this component was selected and/or in defect detection scenarios as discussed below with respect to FIG. 5). This pointer may be stored in connector knowledge store 260.

Process of Monitoring Data Connectors

After data connectors are deployed, defects may occur (e.g., due to back-end changes from a system using the connector). Returning to FIG. 2, connector deployment module 240 may receive information describing a defect reported in connection with the deployed data connector. Connector deployment module 240 may determine a portion of the connector knowledge graph associated with the defect. Connector deployment module 240 may map the portion of the connector knowledge graph to a portion of the API source knowledge graph. Connector deployment module 240 may identify a portion of an API documentation associated with the portion of the API source knowledge graph. Connector deployment module 240 may report at least a portion of the API documentation associated with the portion of the API source knowledge graph as information describing the defect. This process allows the system to report portions of API documents in connection with defects identified during execution of APIs of the connectors. This is described in further detail with respect to FIG. 5.

Figure 5:
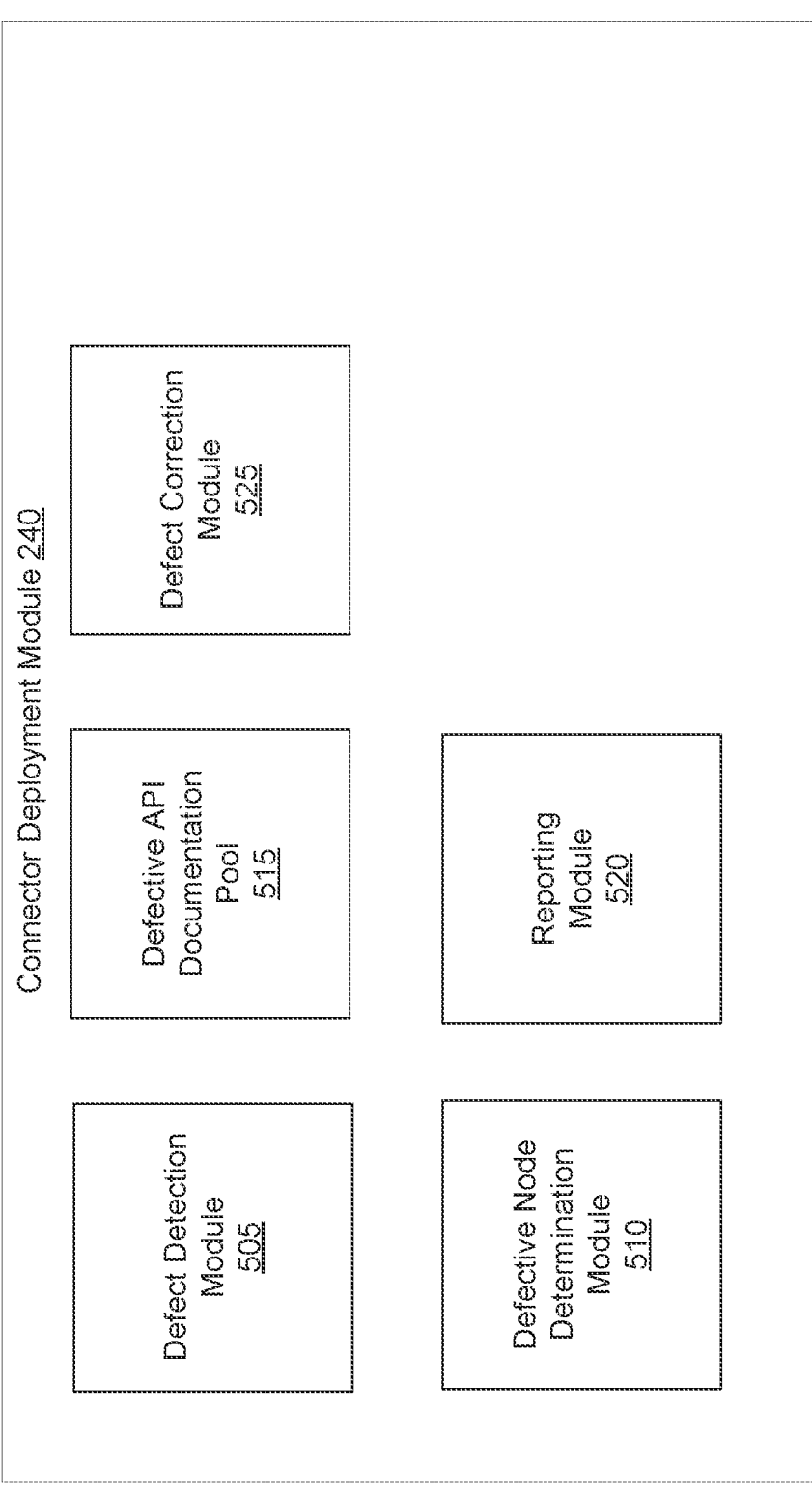
FIG. 5 depicts exemplary modules of a connector deployment module, in accordance with an embodiment.

FIG. 5 depicts exemplary modules of a connector deployment module, in accordance with an embodiment. As depicted in FIG. 5, connector deployment module 240 includes defect detection module 505, defective node determination module 510, defective API documentation pool 515, reporting module 520, and defect correction module 525. More or fewer modules may be used to achieve the functionality described herein.

Connector deployment module 240 acts to deploy a data connector generated from a connector knowledge representation, the connector knowledge representation generated from an API source knowledge graph using a large language model. Connector deployment module 240 may deploy the data connector in any manner discussed with respect to connector builder module 425, where after the connector is built, it is used as a conduit for communications.

Defect detection module 505 may receive information describing a defect reported in connection with the deployed data connector. In some embodiments, the information may be received by defect detection module 505 from a user providing data that reports the defect. In some embodiments, defect detection module 505 may receive the information by proactively testing components of a connector. For example, defect detection module 505 may instruct interactions to occur for each component and may determine whether the expected result was encountered from each interaction. Where an unexpected result was encountered, defect detection module 505 may determine that the information received describing that result describes a defect.

Defective node determination module 510 determines one or more nodes in a knowledge graph that relate to the defect. For example, the knowledge graph may indicate dependencies (e.g., nested documents based on nested headers) between documents. Defective node determination module 510 may determine one or more API documents from which the defective component was derived using a data structure indicating this link. Defective node determination module may determine other documents represented by nodes on the knowledge graph that are dependent on the one or more determined documents. Together, these nodes may reference a defective API documentation pool 515, which is a portion of the connector knowledge graph associated with the defect.

Defective node determination module 510 may map defective API documentation pool 515 to a portion of the API source knowledge graph corresponding to those API documents to mark them as defective, thereby identifying a portion of an API documentation associated with the portion of the API source knowledge graph as being associated with a defect. Reporting module 520 may then report information (e.g., to a developer) describing the defect, the information comprising at least a portion of the API documentation associated with the portion of the API source knowledge graph.

In an embodiment, defective node determination module 510 determines the portion of the connector knowledge graph associated with the defect by determining an API feature of a connector that is causing the defect based on the information received by defect detection module 510. Defective node determination module 510 identifies a node in the API source knowledge graph corresponding to the API feature (e.g., based on a data structure that points to the API source document for the given API feature, as described above). The node may have dependencies, as reflected by directional edges within the knowledge graph, and thus the portion of the API documentation that is identified may reflect the API documentation associated with dependent nodes. Reporting module 520 may report information that corresponds to each of these nodes (e.g., links to all of the API documentation that is part of the identified portion).

Defect correction module 525 may receive commands from a user based on the report to correct the defect, and may update the connector accordingly. Additionally or alternatively, defect correction module 525 may re-run aspects of API knowledge generation module 220 to determine whether there is an updated version of the relevant API documentation. Responsive to determining that there is an updated version of the relevant API documentation, defect correction module 525 may update the API source knowledge store 250 with updated information relating to source knowledge. Defect correction module 525 may delete the defective connector component, and may rebuild the defective connector component using aspects of connector generation module 230 that operate on the updated source knowledge.

Exemplary Data Flows

FIG. 6 depicts an exemplary flow chart illustrating a process for generating an index of source knowledge usable in generating connectors, in accordance with an embodiment. Process 600 may be executed by one or more processors executing instructions stored on a non-transitory computer-readable medium. Process 600 begins with data connector management system 200 identifying 610 one or more external systems (e.g., API documentation source 210) storing API documentation for accessing one or more data source systems (e.g., using data source identification module 305). Data connector management system 200 crawls 620 the one or more external systems to extract a plurality of documents, each document representing information describing APIs for accessing the one or more data source systems (e.g., using crawling module 310).

Data connector management system 200 generates 630 a plurality of vector representations by, for each document of the plurality of documents, providing the document to a neural network to generate a vector representation of the document (e.g., using preprocessing module 315). Data connector management system 200 generates 640 an index that maps each vector representation to its respective document, and extracts 650 information describing a data connector by querying the index, the query corresponding to a particular type of data source (e.g., using knowledge graph building module 320). Data connector management system 200 generates 660 a connector representation based on the information describing the data connector extracted from the index wherein the connector representation is used for generating and deploying a data connector for accessing data from a data source system of the particular type of data source (e.g., using connector generation module 230 based on data stored in API source knowledge store 250).

FIG. 7 depicts an exemplary flowchart illustrating a process for generating a connector by prompting a large language model, in accordance with an embodiment. Process 700 may be executed by one or more processors executing instructions stored on a non-transitory computer-readable medium. Process 700 may begin with data connector management system 200 accessing 710 an index based on representations of documents storing information describing APIs (Application Programming Interfaces) for accessing data source systems (e.g., using knowledge graph retrieval module 410). Data connector management system 200 may then generate 720 a prompt for a large language model (LLM) based on information extracted from the index, the prompt requesting information associated with a data connector for accessing data from the data source system (e.g., using prompt generation module 415).

Data connector management system 200 may provide 730 the generated prompt to the large language model, and may receive 740, from the large language model, a response describing information associated with the data connector. Data connector management system 200 may determine 750 a measure of ambiguity for the response, and, responsive to the measure of ambiguity indicating more than a threshold ambiguity in the response, may generate 760 an additional prompt for the large language model the additional prompt requesting more specific information compared to the information received in the response (e.g., using prompt response disambiguation module 420). Data connector management system 200 may generate a data connector based on source knowledge and/or a connector knowledge representation corresponding to the response, and may deploy the data connector for accessing data from the data source system (e.g., using connector builder module 425).

FIG. 8 depicts an exemplary flowchart illustrating a process for reporting API documentation associated with a detected defect in a deployed connector, in accordance with an embodiment. Process 800 may be executed by one or more processors executing instructions stored on a non-transitory computer-readable medium. Process 800 may begin with data connector management system 200 deploying 810 a data connector generated from a connector knowledge representation, the connector knowledge representation generated from an API source knowledge graph using a large language model (e.g., using connector deployment module 240).

Data connector management system 200 may receive 820 information describing a defect reported in connection with the deployed data connector (e.g., using defect detection module 505). Data connector management system 200 may determine 830 a portion of the connector knowledge graph associated with the defect, and map 840 the portion of the connector knowledge graph to a portion of the API source knowledge graph (e.g., using defective node determination module 510). Data connector management system 200 may identify 850 a portion of an API documentation associated with the portion of the API source knowledge graph (e.g., using defective API documentation pool 515), and may report information describing the defect, the information comprising at least a portion of the API documentation associated with the portion of the API source knowledge graph (e.g., using reporting module 520).

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for generation of a data connector, the method comprising:

accessing an index based on representations of documents storing information describing APIs (Application Programming Interfaces) for accessing data source systems;

determining a subset of documents referenced by the index having at least a threshold similarity to required connector information;

generating a prompt for a large language model (LLM) based on information extracted from the index, the prompt requesting information associated with building a new data connector for accessing data from the data source systems;

providing the generated prompt to the large language model along with instructions to query the subset of documents with the generated prompt;

receiving a respective interim response from each respective document of the subset;

receiving, from the large language model, a response describing information associated with the new data connector, the response comprising each interim response;

determining a measure of ambiguity for the response;

responsive to the measure of ambiguity indicating more than a threshold ambiguity in the response based on two or more interim responses comprising conflicting information, generating an additional prompt for the large language model the additional prompt automatically requesting more specific information compared to the information received in the response, the more specific information requested to resolve the conflicting information, wherein as further conflicting information is received, further prompts requesting further resolution are requested until an ultimate response without an ambiguity is received;

generating the data connector based on a connector knowledge representation corresponding to the ultimate response; and automatically deploying the data connector for accessing data from the data source systems.

2. The method of claim 1, further comprising, repeatedly generating subsequent prompts, each subsequent prompt requesting more specific information compared to previous prompts and providing the subsequent prompts to the large language model.

3. The method of claim 1, further comprising:

initializing a knowledge graph as the connector knowledge representation, the knowledge graph including nodes corresponding to requirements for generating the data connector; and accessing topics of the index based on the requirements for generating the data connector.

4. The method of claim 3, wherein the topics correspond to topics extracted from cleansed document headers crawled from API documentation.

5. The method of claim 1, wherein determining the response from the interim response comprises:

determining the measure of ambiguity to be below the threshold ambiguity based on determining that a first of the interim responses is not a null response and other interim responses are null responses; and determining the response to be equivalent to a result of the first of the interim responses.

6. The method of claim 1, wherein the additional prompt includes context of the conflicting information.

7. A non-transitory computer-readable medium comprising memory with instructions encoded thereon for generation of a data connector, the instructions comprising instructions to:

access an index based on representations of documents storing information describing APIs (Application Programming Interfaces) for accessing data source systems;

determine a subset of documents referenced by the index having at least a threshold similarity to required connector information;

generate a prompt for a large language model (LLM) based on information extracted from the index, the prompt requesting information associated with building a new data connector for accessing data from the data source systems;

provide the generated prompt to the large language model along with instructions to query the subset of documents with the generated prompt;

receive a respective interim response from each respective document of the subset;

receive, from the large language model, a response describing information associated with the new data connector, the response comprising each interim response;

determine a measure of ambiguity for the response;

responsive to the measure of ambiguity indicating more than a threshold ambiguity in the response based on two or more interim responses comprising conflicting information, generate an additional prompt for the large language model the additional prompt automatically requesting more specific information compared to the information received in the response, the more specific information requested to resolve the conflicting information, wherein as further conflicting information is received, further prompts requesting further resolution are requested until an ultimate response without an ambiguity is received;

generate the data connector based on a connector knowledge representation corresponding to the ultimate response; and automatically deploy the data connector for accessing data from the data source systems.

8. The non-transitory computer-readable medium of claim 7, the instructions further comprising instructions to repeatedly generate subsequent prompts, each subsequent prompt requesting more specific information compared to previous prompts and providing the subsequent prompts to the large language model.

9. The non-transitory computer-readable medium of claim 7, the instructions further comprising instructions to:

initialize a knowledge graph as the connector knowledge representation, the knowledge graph including nodes corresponding to requirements for generating the data connector; and access topics of the index based on the requirements for generating the data connector.

10. The non-transitory computer-readable medium of claim 9, wherein the topics correspond to topics extracted from cleansed document headers crawled from API documentation.

11. The non-transitory computer-readable medium of claim 7, wherein the instructions to determine the response from the interim response comprise instructions to:

determine the measure of ambiguity to be below the threshold ambiguity based on determining that a first of the interim responses is not a null response and other interim responses are null responses; and determine the response to be equivalent to a result of the first of the interim responses.

12. The non-transitory computer-readable medium of claim 7, wherein the additional prompt includes context of the conflicting information.

13. A system for generation of a data connector, the system comprising:

memory with instructions encoded thereon; and one or more processors that, when executing the instructions, are caused to perform operations comprising:

accessing an index based on representations of documents storing information describing APIs (Application Programming Interfaces) for accessing data source systems;

determining a subset of documents referenced by the index having at least a threshold similarity to required connector information;

generating a prompt for a large language model (LLM) based on information extracted from the index, the prompt requesting information associated with building a new data connector for accessing data from the data source systems;

providing the generated prompt to the large language model along with instructions to query the subset of documents with the generated prompt;

receiving a respective interim response from each respective document of the subset;

receiving, from the large language model, a response describing information associated with the new data connector, the response comprising each interim response;

determining a measure of ambiguity for the response;

responsive to the measure of ambiguity indicating more than a threshold ambiguity in the response based on two or more interim responses comprising conflicting information, generating an additional prompt for the large language model the additional prompt automatically requesting more specific information compared to the information received in the response, the more specific information requested to resolve the conflicting information, wherein as further conflicting information is received, further prompts requesting further resolution are requested until an ultimate response without an ambiguity is received;

generating the data connector based on a connector knowledge representation corresponding to the ultimate response; and automatically deploying the data connector for accessing data from the data source systems.

14. The system of claim 13, the operations further comprising:

initializing a knowledge graph as the connector knowledge representation, the knowledge graph including nodes corresponding to requirements for generating the data connector; and accessing topics of the index based on the requirements for generating the data connector.

15. The system of claim 14, wherein the topics correspond to topics extracted from cleansed document headers crawled from API documentation.

* * * * *